E. A. KEAN AND B. L. NICHOLSON.
STREET CAR ENUNCIATOR.
APPLICATION FILED MAR. 15, 1920.

1,378,465. Patented May 17, 1921.

Inventor
Benjamin L. Nicholson
Elwood A. Kean

By Richard J. Cook
Attorney

UNITED STATES PATENT OFFICE.

ELWOOD A. KEAN AND BENJAMIN L. NICHOLSON, OF TACOMA, WASHINGTON.

STREET-CAR ENUNCIATOR.

1,378,465.    Specification of Letters Patent.    Patented May 17, 1921.

Application filed March 15, 1920. Serial No. 366,067.

*To all whom it may concern:*

Be it known that we, ELWOOD A. KEAN and BENJAMIN L. NICHOLSON, citizens of the United States, and residents of the city of Tacoma, county of Pierce, and State of Washington, have invented certain new and useful Improvements in Street-Car Enunciators, of which the following is a specification.

Our invention relates to improvements in signaling devices, and more particularly to a device of that character comprising an electric circuit closing mechanism that may be mounted on one of the rails of a car track to be actuated by a car in passing thereover to cause to be announced by an audible signal, such as an electric bell, the approach of the car at any desired distance in advance thereof.

The principal object of the invention is to provide means for signaling to persons residing along a car line, particularly interurban lines, the approach of a car, so that they will have sufficient time to reach the car at its stopping point and thus avoid having to wait in the open for the car to arrive or missing the same.

In accomplishing this and other objects of the invention, we have provided the improved details of construction, the preferred forms of which are illustrated in the accompanying drawings, wherein.

Figure 1:
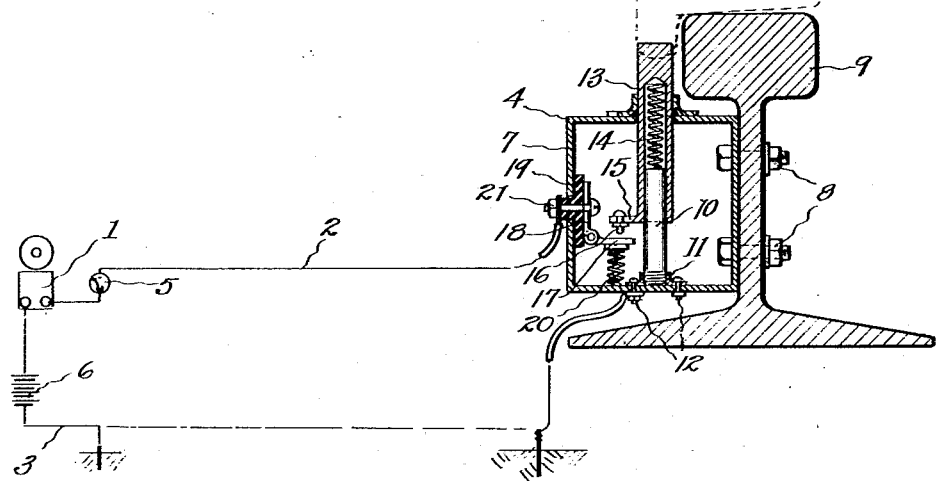
Figure 1 is a cross-sectional view of a circuit closing device constructed and mounted on a rail according to the present invention, with a diagrammatic illustration of its electrical connection with a battery and bell.
Figure 2:
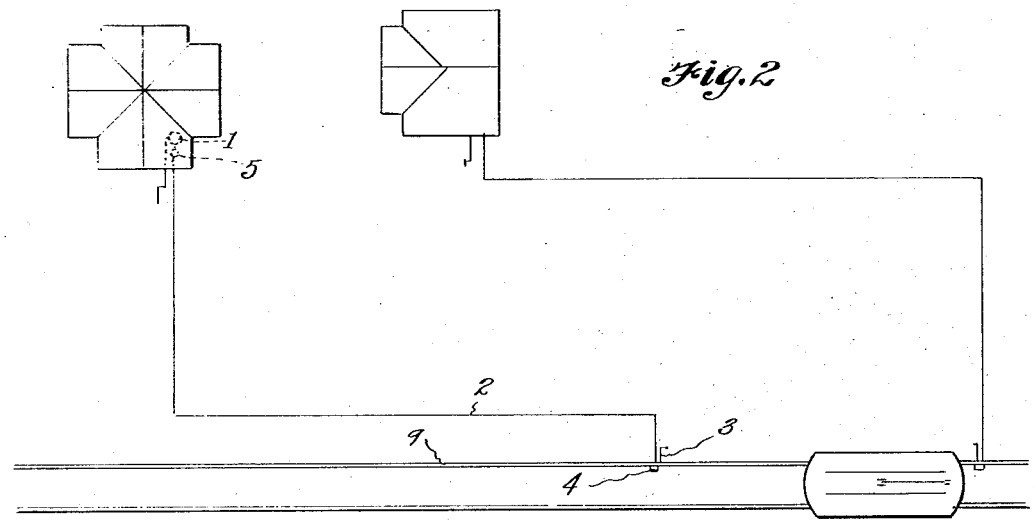
Fig. 2 is a diagrammatic illustration showing the method of placing the circuit closing devices on a track and their connection with enunciators in residences along the way.

Referring more in detail to the drawings:

In its preferred form of construction the enunciator, or signaling device, consists of an electrically operated bell, or the like, indicated by numeral 1, which is electrically connected by means of circuit wires 2 and 3, with a circuit closing device, as indicated at 4, which is actuated to close a circuit when a certain part thereof is engaged by the flange of a car in passing. A switch 5 is interposed in the connection, preferably near the bell, which may be closed whenever it is desired to receive the signal of an approaching car, or which may be left open when it is not desired, and a battery or other source of electrical energy is placed in the circuit, as shown at 6, so that, with the switch 5 closed, energizing of the bell mechanism to give an audible signal is effected by closing the circuit through the mechanism of the device 4.

This circuit controlling device 4 consists of mechanism located within a metallic housing 7 which is secured by bolts 8 to the inner side of the web portion of a rail 9 over which a car passes. Mounted within the housing is a vertical post 10 which is threaded at its lower end into a flanged member 11 that is secured by bolts 12 to the base of the housing.

The upper end of the post terminates within the housing and slidably mounted thereon and extending through an opening in the top of the housing, is a sleeve 13, the upper end of which is disposed adjacent the side of the rail in such position that it will be engaged and depressed by the flange of a car wheel in passing thereover. A coiled spring 14 is inclosed within the sleeve and engages the upper end of the post to normally retain the sleeve extended from the housing.

At its lower end the sleeve has a laterally extending flange 15 which mounts a contact point 16 that moves with the sleeve, when the latter is depressed into circuit closing contact with a plate 17 which is hingedly attached to a plate 18, mounted on a block of insulation, 19, which in turn is mounted on the inner wall of the housing. A small spring 20 engages the underside of the plate 17 to retain the same in position to be contacted by the point 16 but permits it to yield when the sleeve moves downwardly.

Electric connection is made between the plate 18 and wire 2 by attaching the latter to a binding post 21 that secures the plate in position, and connection is made through the post, sleeve and contact point 16, by attaching the wire 3 to the housing by utilizing a bolt 12, however, the spring 14 normally retains the sleeve at such height that the point 16 does not engage the plate 17 and the circuit is left open. Only when the sleeve is depressed is there any circuit connection made.

In using the device, it is intended that the circuit closing device 4 be fixed to a rail of the track on which the cars approach at some distance from a stopping point, and to connect the same electrically through a battery and switch with an electrically operated bell which is located at any suitable place in a residence where it can be heard.

When one wishes to board the next car that will arrive, the switch 5, which is preferably within the residence, is closed and as the car approaching passes over the sleeve, or plunger, extending from the housing, it depresses the latter so that it closes the circuit and causes the bell to give a warning. The person waiting may then, on hearing the bell, go to the stopping point and board the car, thus avoiding any long waiting or missing the car altogether.

It is apparent that such a device would be of benefit to people residing along interurban lines, where the time between cars is long and the time of arrival is irregular.

Having thus described my invention, what I claim as new therein and desire to protect by Letters Patent is:

1. The combination with an electrically operated signaling device, a source of electricity, and a railway rail of a circuit closing device comprising a housing supported from the rail web, a post mounted vertically within the housing, a sleeve, closed at its upper end, slidably mounted on the post and extending from said housing into position to be depressed by the wheels of cars moving along the rail, a spring interposed within the sleeve to retain the same normally extended; said sleeve having a contact arm extending laterally therefrom at its lower end, a yieldable contact member mounted within the housing engageable by the said arm when the sleeve is depressed and means electrically connecting the contact arm and contact member engaged thereby with the signaling device through the source of electricity.

2. The combination with an electrically actuated alarm and a railway rail, of a circuit closing device comprising a housing secured to the rail web, a post mounted vertically within the housing, a sleeve, having a laterally extending contact arm at its lower end and closed at its upper end, slidably mounted on said post and extending at its upper end adjacent the side of the rail to be engaged and depressed by wheels of cars moving along the rail, a spring interposed within the sleeve to normally retain the same extended, a hingedly mounted contact member mounted within the casing and extending horizontally beneath the contact arm to be engaged thereby when the sleeve is depressed, a spring disposed within the housing to normally retain the contact member in horizontal position but permitting it to yield downwardly when engaged by said arm and means electrically connecting the said contact arm and hinged member with the alarm device through a source of electricity.

Signed at Seattle, Washington, this 10 day of February, 1920.

ELWOOD A. KEAN.
BENJAMIN L. NICHOLSON.